UNITED STATES PATENT OFFICE.

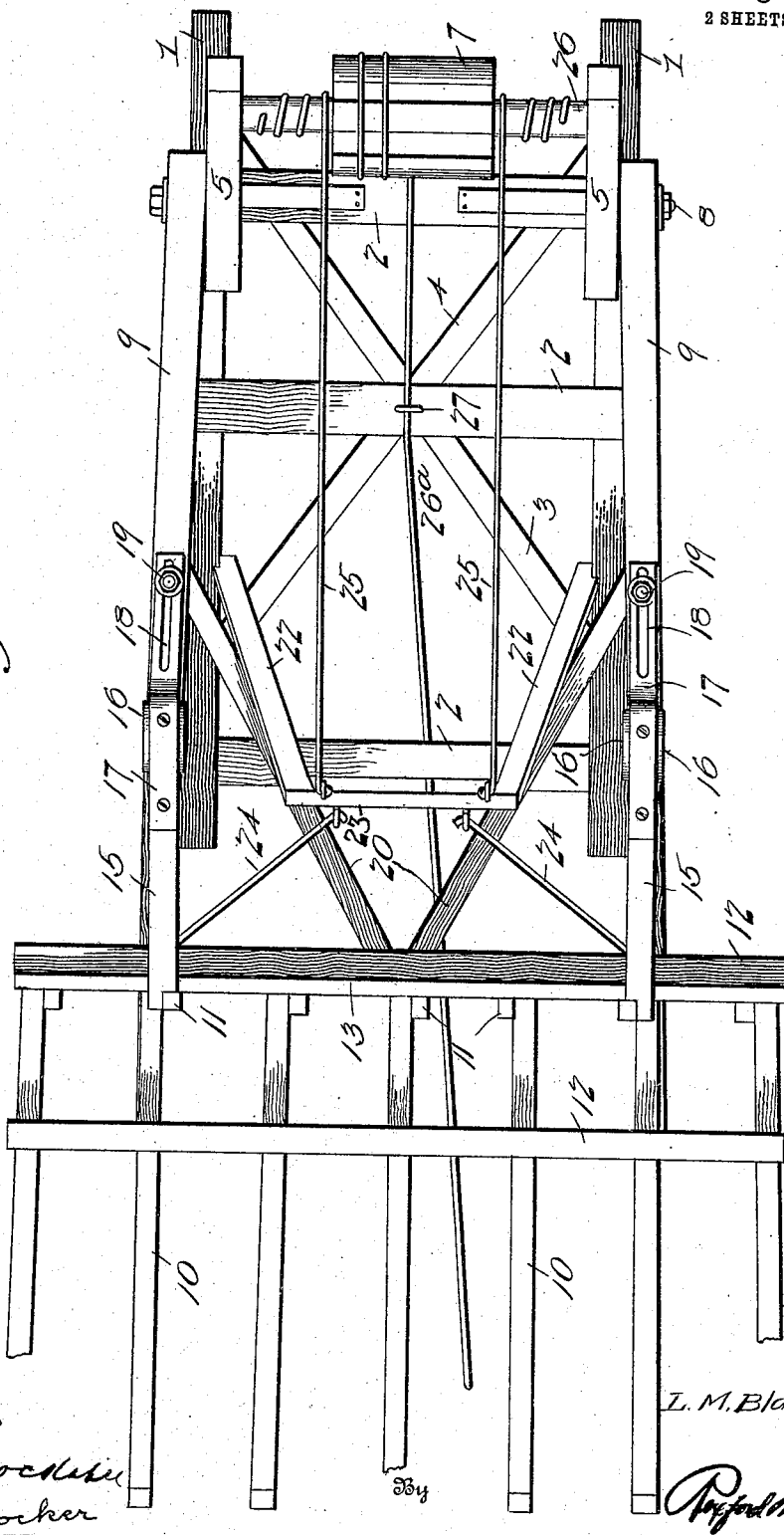

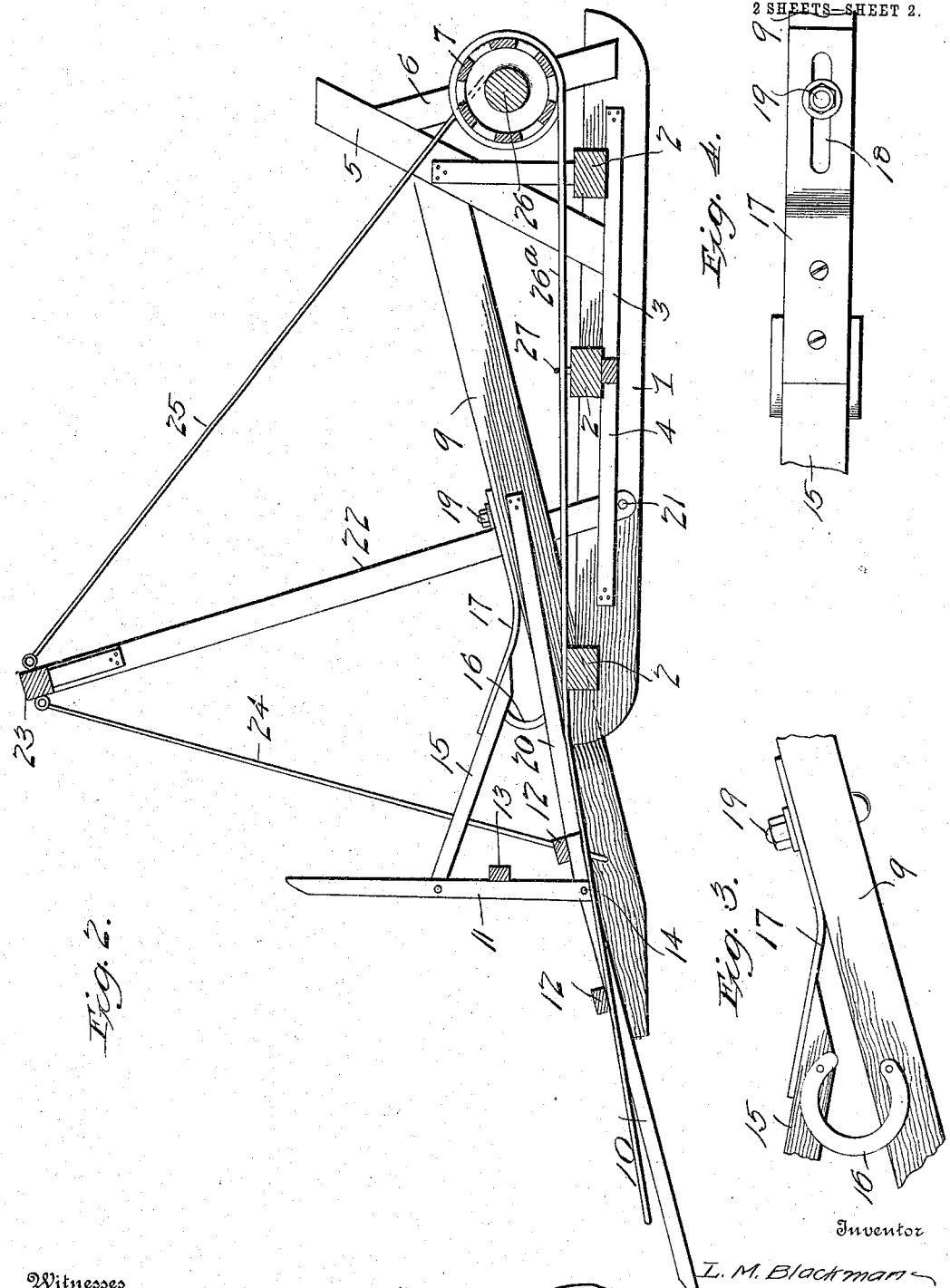

LEROY M. BLACKMAN, OF LUCERNE, MISSOURI.

STACKER.

932,751. Specification of Letters Patent. Patented Aug. 31, 1909.

Application filed January 25, 1908. Serial No. 412,610.

*To all whom it may concern:*

Be it known that I, LEROY M. BLACKMAN, a citizen of the United States, residing at Lucerne, in the county of Putnam and State of Missouri, have invented a certain new and useful Stacker, of which the following is a specification, reference being had therein to the accompanying drawing.

This invention relates to hay stackers and the object of the invention is to provide a stacker of simple and effective construction and operation which is capable of being easily manipulated to stack the hay or straw and in which the "baby" teeth or shorter back teeth of the fork or rake are made adjustable as to their pitch relatively to the longer or main teeth to insure the easy and timely delivery or discharge of the load therefrom.

With the above and other objects in view, the nature of which will fully appear as the description proceeds, the invention consists in the novel construction, combination and arrangement herein fully described, illustrated and claimed.

In the accompanying drawings:—Figure 1 is a plan view of the hay stacker embodying the present invention. Fig. 2 is a vertical longitudinal section through the same. Fig. 3 is a detail side elevation of the connection between the baby teeth and the arms of the rake or fork. Fig. 4 is a detail plan view showing the manner of adjusting and holding the baby teeth.

The stacker comprises a suitable base consisting of longitudinal timbers or runners 1 connected rigidly by cross-bars 2 at intervals, and diagonal braces 3 and 4 which connect the side timbers or bars 1 and one or more of the cross bars 2, thus forming a stout rigid frame on which the remainder of the stacker mechanism is mounted.

Extending up from the base frame at opposite sides are inclined posts 5 between which and the side bars are braces 6, the latter also forming supports for the bearings of a drum or windlass 7, hereinafter more particularly described.

Pivotally connected to the posts 5 at the points 8, are oppositely arranged stacker arms 9. The opposite or free ends of said arms carry the stacker rake or fork which comprises the main fork member embodying the longer teeth 10, and the back fork member 11 embodying the shorter or baby teeth. The longer teeth 10 are secured together by a plurality of cross bars 12 and 13 and also fastened to the arms 9 to move therewith. The shorter teeth 11 are secured together by one or more cross bars 13 and said smaller rake or fork member is connected pivotally at 14 to the other fork member.

A brace 15 is pivotally connected at one end to the smaller fork member 11 and has its opposite or rear end also pivotally connected to a segmental link 16 in the form of a horseshoe, as best illustrated in Fig. 3, it being noted that one end of the link is connected to the brace 15 while the other end thereof is pivotally connected to the adjacent arm 9. It will be understood that two braces 15 are employed, one in connection with each stacker arm 9, and a pair of segmental links 16 are used in connection with each brace to straddle the brace and stacker arm and prevent relative lateral play or looseness between said parts. It is important to obtain a firm connection at this point on account of the fact that when the rake or fork is elevated the weight of the load is transferred from the teeth 10 to the teeth 11 and the latter must be supported by the braces 15. Flexible stay straps 17 are secured to the lower ends of the braces 15 and provided with slots 18 which receive clamps, preferably in the form of bolts 19 on the stacker arms 9, whereby the braces 15 may be held when adjusted. By the means described the smaller member of the rake or fork may be adjusted as to its angle to the main member to cause the load to slide easily therefrom when the fork or rake is elevated to discharge its load. 20 designates diagonal braces between the arms 9 and the main fork or rake member.

Connected pivotally at 21 to the base frame is a crane comprising upwardly converging arms or side bars 22 and top cross bar 23 connecting the same. Rods 24 extend from the arms 9 upward to the top bar 23, and winding connections 25 run from said top bar around the shaft 26 of the drum 7, said connections winding on the shaft 26 at opposite sides of the drum as shown in Fig. 1. An operating connection 26ª is attached to the drum and is wound thereon and leads forward under the rake or fork through one or more guide eyes 27 to be within convenient reach of the operator who by pulling on said connection may hoist the load of hay or straw and cause the fork to deliver the same upon the stack. In heavy work a draft animal may be hitched to the operating connection 26ª to perform the work. The base frame of the stacker may rest on the ground or be supported on carrying wheels as may be found expedient.

I claim:—

A stacker comprising a base, stacker arms, having a jointed connection at one end therewith, means for raising and lowering said arms, and a rake embodying two pivotally related members one of which is fastened to the stacker arms, braces connected pivotally to the other member, segmental links connected at one end to the braces and at the other end to the stacker arms, slotted stay straps connected to said braces, and clamping means for fastening said braces when adjusted.

In testimony whereof I affix my signature in presence of two witnesses.

LEROY M. BLACKMAN.

Witnesses:
J. F. MYERS,
J. LEE HAWK.